Dec. 19, 1961 J. A. SMITH 3,013,758
FLOWER HOLDER
Filed Oct. 27, 1959
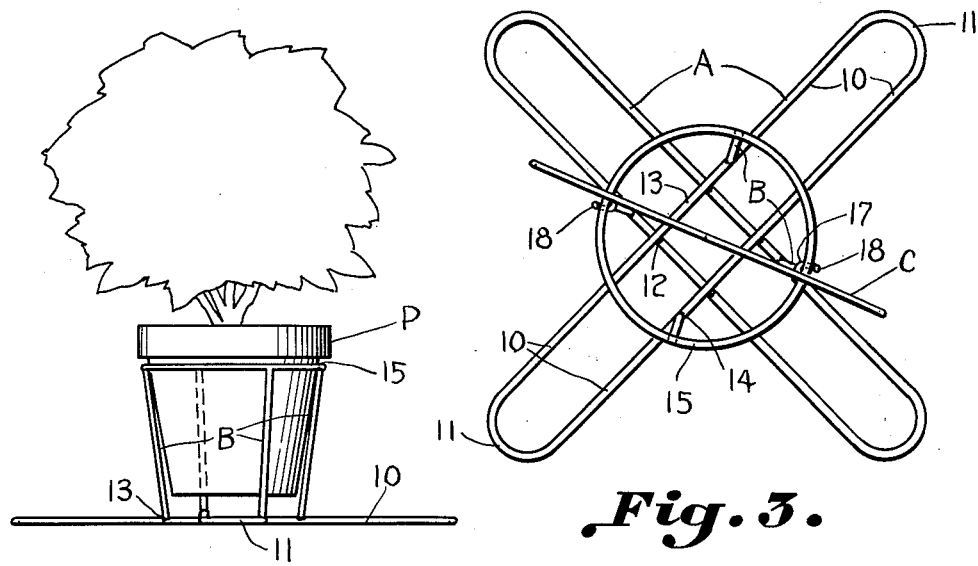
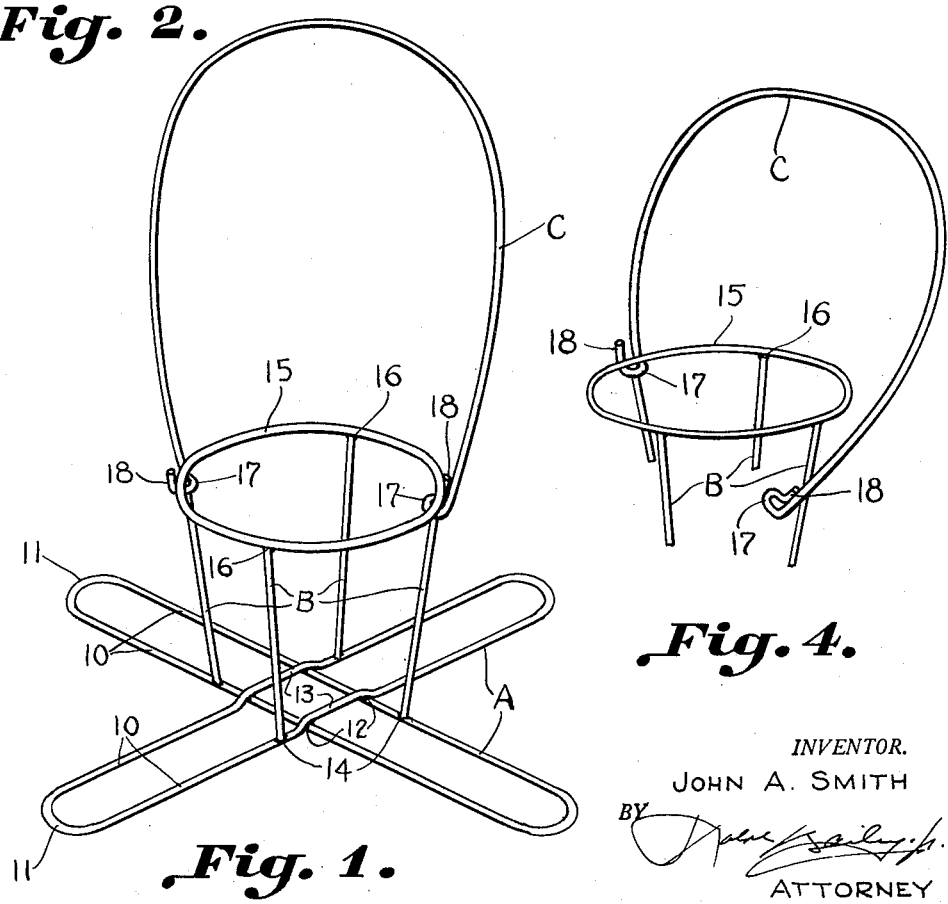
INVENTOR.
JOHN A. SMITH
ATTORNEY

United States Patent Office 3,013,758
Patented Dec. 19, 1961

3,013,758
FLOWER HOLDER
John A. Smith, 824 Hazelwood Drive, Columbia, S.C.
Filed Oct. 27, 1959, Ser. No. 849,111
2 Claims. (Cl. 248—153)

This invention relates to holders or stands and the like for supporting flower arrangements.

Containers for flowers, especially where used for outdoor flower arrangements such as for funerals, where substantial support must be provided against turning over have either been provided with devices projecting into the earth for attaching the container to the ground or with broad flat bases which injure the grass upon prolonged placement in one spot. It is not always convenient to thus attach the devices to the ground and it is inconvenient to move a device of either type from one place to another.

Accordingly it is an object of this invention to provide an improved flower holder which neither requires attachment to the ground nor results in damage to the grass.

An important object of this invention is the provision of a flower holder and the like which will be effective in resisting turning over and yet easy and convenient to use.

Another object of this invention is the provision of a flower holder which may be easily moved from place to place and yet be useful in a variety of situations while resisting overturning.

Still another object of this invention is the provision of a flower holder of open balanced construction so as to resist the tendency for the wind to blow same over.

Another object of this invention is the provision of a flower holder having a receptacle of open construction for holding any suitable container such as pots, papier-mache and the like.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIGURE 1 is a perspective view of a flower holder constructed in accordance with the present invention, FIGURE 2 is an elevation view, at a slightly reduced scale, looking from the left hand front side of FIGURE 1 with the handle removed with a flower pot positioned therein, FIGURE 3 is a plan view taken from FIGURE 1, and FIGURE 4 is a perspective view with parts omitted illustrating the mode of fastening and removing the handle.

Referring more particularly to the drawings, a pair of horizontally disposed elongated open looped members A overlap at right angles and are joined together to form a base. A plurality of spaced upwardly extending members B are suitably fastened to said looped members to form a receptacle. A handle C is removably fastened to opposed upwardly extending members B.

The base members A, as shown in FIGURES 1, 2, and 3, include a pair of parallel sides 10 and an arcuate portion 11 joining their ends to form a closed loop. The base members A extend outwardly for a substantial distance and are of substantial width. It has been found that this particular construction offers unusually great resistance to the holder being overturned due to wind or being inadvertently pushed. The base members A are preferably constructed of relatively light bar material, and while offering all the advantages of a very broad base, are of open construction so as not to damage the grass and are light in weight. The base members A are shown connected at right angles as by welding 12, one of the members having a raised portion 13 in its medial portion so that its outer portions will be flat.

The receptacle members B are preferably constructed from similar metallic material and are shown fastened as by welding 14 in the medial portions of the base members A. The members B make an open construction practicable as well as effective in supporting a variety of flower arrangements while making for easy attachment of a handle. A looped portion 15, preferably of similar material, forms the upper portion of the receptacle and is shown fastened to the upper ends of the members B as by welding 16. A flower pot P is illustrated as being supported in the receptacle by the looped portion 15.

A handle C for use in conveniently carrying the holder about is provided with a loop 17 at each end projecting from without the looped portion 15 on one side of the respective member B encompassing the inner portion of the members B. An upward projection 18 passing on the other side of the member B locks outside the looped portion 15. The members B converge slightly downwardly so that the handle C is securely attached and since the handle is preferably constructed of resilient material, the handle C may be readily attached and detached.

While a preferred embodiment of the invention has been described using specific terms, such description is for illustrative purposes only, and it is to be understood that changes and variations may be made without departing from the spirit or scope of the following claims.

What is claimed is:

1. A wire flower receptacle holder including, a pair of horizontally disposed elongated open looped members each including, a pair of substantially parallel spaced sides joined at their ends, said looped members overlapping at their central portions at substantially right angles and being joined together lying substantially in a common plane to form a base, a plurality of radially spaced upwardly extending members rigidly fastened to the sides of said looped members each being substantially equally spaced from the center of the base adjacent the juncture thereof, the overlapped portions of one of said looped members being raised so that the lower surfaces of all looped portions lie in said common plane, and a substantially circular portion fixed adjacent the top of said upwardly extending members forming a receptacle holder therewith, said looped members extending outwardly of said upwardly extending members a substantial distance, whereby a broad open base is formed.

2. A flower receptacle holder as set forth in claim 1, in which each pair of substantially parallel spaced sides is joined at its ends by an arcuate member.

References Cited in the file of this patent
UNITED STATES PATENTS

| | | |
|---|---|---|
| 240,891 | Cook | May 3, 1881 |
| 462,361 | Miller | Nov. 3, 1891 |
| 2,191,061 | Potts | Feb. 20, 1940 |
| 2,250,361 | Cullinan | July 22, 1941 |
| 2,690,283 | Comploier | Sept. 28, 1954 |